United States Patent [19]

Kast et al.

[11] 4,135,043
[45] Jan. 16, 1979

[54] PROCESS FOR PREPARING POLYMERS IN POWDER FORM

[75] Inventors: Bernd Kast, Ludwigshafen; Joachim Stedefeder, Lampertheim; Axel Sanner, Frankenthal; Hans-Uwe Schenck, Wachenheim; Richard Thoma, Battenberg; Hermann Fischer, Limburgerhof, all of Fed. Rep. of Germany

[73] Assignee: BASF Aktiengesellschaft, Ludwigshafen, Fed. Rep. of Germany

[21] Appl. No.: 820,720

[22] Filed: Aug. 1, 1977

[30] Foreign Application Priority Data

Aug. 12, 1976 [DE] Fed. Rep. of Germany ....... 2636243

[51] Int. Cl.$^2$ .................. C08F 2/10; C08F 20/06; C08F 20/70
[52] U.S. Cl. .................................. 526/63; 526/71; 526/88; 526/194; 526/201; 526/202; 526/203; 526/220; 526/240; 526/303; 526/909
[58] Field of Search ............... 526/63, 71, 909, 88, 526/201, 202, 203, 194

[56] References Cited

U.S. PATENT DOCUMENTS

| | | | |
|---|---|---|---|
| 2,789,099 | 4/1957 | Rife et al. | 526/194 |
| 2,806,018 | 9/1957 | Price | 526/203 |
| 2,956,046 | 10/1960 | Glauis et al. | 526/202 |
| 2,976,263 | 3/1961 | Jen et al. | 526/201 |
| 3,278,506 | 10/1966 | Chamot et al. | 526/207 |
| 3,814,742 | 6/1974 | Nagy | 526/88 |
| 3,875,130 | 4/1975 | Kemp | 526/63 |
| 3,919,140 | 11/1975 | Hirata et al. | 526/202 |
| 3,975,341 | 8/1976 | Trapasso | 526/207 |
| 4,032,701 | 6/1977 | Hughes | 526/88 |
| 4,037,040 | 7/1977 | Trapasso et al. | 526/909 |

*Primary Examiner*—Herbert J. Lilling
*Attorney, Agent, or Firm*—Keil, Thompson & Shurtleff

[57] ABSTRACT

Polymers in powder form are manufactured by polymerizing water-soluble ethylenically unsaturated monomers, which form hydrophilic polymers, in a powder bed of polymers of water-soluble ethylenically unsaturated compounds in the presence of polymerization initiators and water as an auxiliary liquid, the water being entirely or partially removed from the polymerization zone by evaporation during the polymerization.

10 Claims, No Drawings

PROCESS FOR PREPARING POLYMERS IN POWDER FORM

The present invention relates to a process for the manufacture of polymers in powder form from ethylenically unsaturated compounds in the presence of hydrophilic polymers in powder form, auxiliary liquids and polymerization initiators, the reaction batch being mixed, and the powder state maintained, during the polymerization.

French Pat. No. 1,117,753 discloses the manufacture of hydrophobic polymers, e.g. polyvinyl chloride, by polymerizing ethylenically unsaturated monomers in the presence of a diluent and of a polymerization initiator, to give a polymer powder, whilst mixing the reaction batch and maintaining the powder state during the reaction. The hydrophobic polymers are insoluble in the monomers and in the diluents. The diluent employed is water, which serves to remove the heat of polymerization from the system. The water is condensed and returned to the reaction mixture. Using this process, it is not possible to manufacture hydrophilic polymers in powder form, because the water which accumulates in the polymerization zone dissolves or swells the hydrophilic polymers, so that the polymer particles stick together.

It is an object of the present invention to provide a process for the manufacture of hydrophilic polymers in powder form, in which ethylenically unsaturated compounds are polymerized in the presence of their polymers in powder form, auxiliary liquids and polymerization initiators, whilst mixing the reaction batch and maintaining the powder state, i.e. the formation of a second, liquid phase is prevented.

We have found that this object is achieved, according to the invention, by polymerizing one or more water-soluble ethylenically unsaturated compounds, which form a hydrophilic polymer, in the presence of water as the auxiliary liquid, and removing the water entirely or partially from the polymerization zone by evaporation during the polymerization.

This method gives hydrophilic polymers in powder form, which have a particle diameter of the order of from 1 to 5 mm. If the process results in powders which are too coarse for a particular use, the powders can be milled or comminuted in conventional equipment.

The main ethylenically unsaturated compounds which are polymerized in accordance with the invention are soluble or swellable in water and form hydrophilic homopolymers. Examples are ethylenically unsaturated monocarboxylic acids of 3 to 5 carbon atoms and corresponding dicarboxylic acids and their anhydrides, e.g. acrylic acid, methacrylic acid, maleic acid, maleic anhydride, fumaric acid and itaconic acid, and derivatives of such acids, such as the amides of ethylenically unsaturated carboxylic acids, above all acrylamide and methacrylamide, and basic acrylamides and methacrylamides, e.g. dialkylaminoalkylacrylamides and -methacrylamides, e.g. dimethylaminomethylacrylamide, dimethylaminoethylacrylamide and diethylaminoethylacrylamide, esters of ethylenically unsaturated carboxylic acids with amino-alcohols, vinylpyrrolidone and its derivatives, vinylimidazole and substituted vinylimidazoles and vinylsulfones. The ethylenically unsaturated carboxylic acids can also be employed in a neutralized or partially neutralized form. For example, the ammonium, amine and alkali metal salts, above all the sodium salts and potassium salts, can be used. The said monomers can be polymerized individually or as mixtures, e.g. copolymers of acrylamide and acrylic acid, or copolymers of methacrylamide, dimethylaminoethyl acrylate and acrylic acid can be manufactured.

However, the polymerization can also be carried out in the presence of ethylenically unsaturated monomers which are only sparingly soluble in water, e.g. esters of ethylenically unsaturated carboxylic acids and alcohols of 1 to 8 carbon atoms, e.g. methyl acrylate, methyl methacrylate and 2-ethylhexyl acrylate, vinyl ethers, acrylonitrile and methacrylonitrile. This group of monomers, which are of limited solubility in water, may account for up to 75% by weight, preferably from 5 to 40% by weight, of the copolymers. The only important proviso is that the copolymer obtained should be hydrophilic. The water-soluble ethylenically unsaturated compounds can also be copolymerized with compounds which contain two or more ethylenically unsaturated double bonds, so that crosslinked polymers which, however, are still swellable in water are obtained. Examples of suitable comonomers of this nature are butanediol diacrylate, methylene-bis-acrylamide, divinyldioxane, ethylenedivinylurea and pentaerythritol triallyl ether. At most, 5% by weight, based on total monomers, of the crosslinking comonomers possessing two or more double bonds are employed in the polymerization.

The ethylenically unsaturated monomers are dissolved in water or, where the monomers are water-insoluble, emulsified therein. To obtain a stable emulsion of the water-insoluble monomers it is as a rule necessary to use an emulsifier, for example non-ionic, anionic or cationic emulsifiers, or mixtures of non-ionic and cationic emulsifiers or of non-ionic and anionic emulsifiers. The amount of emulsifier is normally from 0.1 to 2% by weight, based on the sparingly water-soluble or insoluble monomers. The aqueous solution or emulsion of the monomers generally contains from 30 to 90, preferably from 50 to 80, % by weight of at least one monomer.

The process according to the invention is preferably carried out by introducing a ready-formed polymer of the monomers to be used in powder form into a polymerization zone and heating it, with mixing, for example by means of a stirrer, to the temperature at which the polymerization of the monomers is to take place. If a polymer in powder form is not available, it can be manufactured by one of the conventional processes, e.g. by mass-polymerizing the monomers and comminuting the solid polymer, or by polymerizing a water-in-oil emulsion of the monomers and precipitating and isolating the polymer formed. Preferably, a polymer, in powder form, which corresponds to the composition of the polymer being formed from the monomer mixture, is initially introduced. However, an inert inorganic material, e.g. quartz powder, talc or aluminum oxide, may be employed instead of the polymer powder. The particle diameter of the initial powder is as a rule from 0.1 to 5 mm.

The aqueous solution or emulsion of the monomers is then introduced into the polymerization zone, preferably by spraying. The monomer solution or emulsion may already contain the polymerization initiator, with or without conventional assistants usually employed in polymerizations, e.g. polymerization regulators. However, the polymerization initiators may also be introduced into the polymerization zone separately from the monomers, e.g. in aqueous solution. Preferably the solution or emulsion of the ethylenically unsaturated monomer(s) and the solution of the polymerization initiator are heated to the polymerization temperature before being introduced and they may be mixed between heating and introduction. The conventional polymerization initiators, e.g. peroxides, hydroperoxides, azo compounds and redox catalysts, in the conventional concentrations, may be used for the process according to the invention.

During the polymerization of the monomers, the powder state is constantly maintained in the polymerization zone, and water is removed from the said zone by evaporation. The water not only serves as a solvent for the monomers but also serves to remove the heat of polymerization. During the polymerization, the water is entirely or partially evaporated from the reaction mixture. The amount of water removed from the polymerization zone depends not only on the heat of polymerization which is to be removed, but also on the intended water content of the polymer formed. In general, the amount of water evaporated from the reaction mixture is such as to remove thereby at least 50% of the heat of polymerization. The water content of the polymer powder depends on the nature of the polymer and may vary within wide limits, e.g. from 0 to 30, preferably from 0.5 to 10, % by weight.

The polymerization is preferably carried out at from 20° to 150° C. under atmospheric pressure or reduced pressure, but can also be carried out under superatmospheric pressures, e.g. 100 atmospheres. The process of the invention may be carried out continuously or batchwise. Examples of suitable reaction zones are stirred kettles or stirred autoclaves. If the process is carried out continuously, the monomer solution or emulsion, together with the initiators and assistants (e.g. regulators) is fed continuously into the polymerization zone, whilst the polymer formed is removed therefrom, continuously or intermittently, by means of a suitable discharge device, e.g. a discharge screw. In order to maintain a particular particle size range of the polymer in the polymerization zone, it may at times become necessary continuously to recycle fine powder into the said zone (with or without interpolation of a milling step). It is particularly advantageous if the monomer solution is heated to the polymerization temperature before being introduced into the polymerization zone. This procedure concerns the embodiment in which the monomer solution already contains the polymerization initiator. Of course it is a precondition that short residence times are employed during mixing and heating, so that the monomers do not polymerize prematurely.

The Examples which follow illustrate the invention. The K values given in the Examples were determined by the method of H. Fikentscher, Cellulosechemie 13, (1932), 58-64 and 71-74, in 5% strength aqueous sodium chloride solution at 25° C.; $K = k \times 10^3$.

The calcium binding capacity (Example 1) is determined by introducing 0.5 g of sodium polyacrylate powder into 1 liter of neutral water of 20° German hardness at 25° C., allowing the powder to act for 30 minutes whilst agitating the mixture, and back-titrating the residual hardness.

The polymerization vessel used in the Example was a cylindrical glass vessel of 5 liters capacity, equipped with a spiral stirrer and a condenser. A spray nozzle, entering the glass vessel, was used to spray the monomer solution, together with initiator, onto the initially introduced polymer in powder form. A nitrogen line also entered the glass vessel. The polymerization was carried out under nitrogen, and the vessel was heated by means of an oil bath. In all the Examples, the monomer solution was mixed with the solution of the polymerization initiator in a static mixer. A heat exchanger was fitted into the line through which the monomer was passed to the static mixer, so that where required, the monomer solution could be heated beforehand to the polymerization temperature. A separator for removing any solids entrained by the nitrogen or by the evaporating water was fitted into the line leading to the condenser.

EXAMPLE 1

1,700 g of a sodium polyacrylate powder which has a particle diameter of from 1 to 2 mm, a water absorbency of 20 g of water/g of polymer, and a calcium binding capacity of 248 mg of calcium oxide/g of polymer, are introduced into the apparatus described above. The polymer contains 5% by weight of methylene-bis-acrylamide units as the crosslinking agent. The oil bath is heated at 120° C. and the temperature of the polymer in the polymerization vessel is 110° C. 455 ml/hour of a 32.4% strength aqueous sodium acrylate solution, which contains 0.125% of methylene-bis-acrylamide as the crosslinking agent and has been preheated to 50° C., are combined in the static mixer with 45 ml/hour of an 0.5% strength potassium persulfate solution and the mixture is sprayed continuously onto the heated polymer powder. The polymerization temperature is 110° C. and during the polymerization about 250 ml/hour of water are distilled from the polymerization vessel.

After a polymerization time of 4 hours, 670 g of a crosslinked sodium polyacrylate which has a water absorbency of 18 g of water/g of polymer, and a calcium binding capacity of 230 mg of calcium oxide/g of polymer, are obtained. The residual water content of the polymer powder is 20%.

EXAMPLE 2

2,000 g of polyacrylamide having a K value of 112 and a particle diameter of from 1 to 2 mm are introduced into the apparatus described above. The polymer powder is heated at 115° C. 380 ml/hour of a 60% strength aqueous acrylamide solution, containing 1.2% of ammonium formate as a regulator, are then mixed with 22 ml/hour of a 5% strength aqueous ammonium persulfate solution in a static mixer and sprayed onto the polymer powder in the reaction vessel. The polymerization temperature is 112° C. Per hour, about 140 ml of water are distilled from the reaction mixture. 320 g of a polyacrylamide having a K value of 70 are obtained in 75 minutes.

EXAMPLE 3

2,000 g of a copolymer of 2 parts of acrylamide and 1 part of sodium acrylate are introduced into the apparatus described above and heated to a polymerization temperature of 120° C. This copolymer has a K value of 120 and a particle diameter of from 1 to 2 mm. 380 ml/hour of a 40% strength aqueous acrylamide solution, which contains 20% by weight of sodium acrylate and 0.6% of ammonium formate as a regulator, are then mixed continuously in the static mixer with 22 ml/hour of a 5% strength aqueous ammonium persulfate solution, and sprayed continuously onto the copolymer, in powder form, of acrylamide and sodium acrylate, which has been introduced into the polymerization apparatus. During the polymerization the polymer and the solution sprayed onto it are mixed thoroughly, and about 120 ml/hour of water are distilled off. After a polymerization time of 100 minutes, 400 g of a copolymer of acrylamide and sodium acrylate, having a K value of 110 are obtained. At the end of the experiment, the moisture content of the polymer was about 5% by weight.

EXAMPLE 4

1,320 g of a sodium polyacrylate in powder form, having a K value of 24.7, are introduced into the apparatus described above. The particle diameter of the powder is less than 0.5 mm. 455 ml/hour of an aqueous 39% strength sodium acrylate solution and 45 ml/hour of an 0.5% strength aqueous potassium persulfate solution are then mixed in the static mixer and sprayed continuously onto the powder. The polymerization temperature is 110° C. During the polymerization, about 250 ml of water per hour are distilled continuously from the reaction mixture. In the course of 3 hours, 400 g of a sodium polyacrylate having a K value of 106 are obtained. The moisture content of the polymer at the end of the experiment is about 10% by weight.

We claim:

1. A process for the manufacture of a hydrophilic polymer in powder form from one or more water-soluble ethylenically unsaturated compounds which form the hydrophilic polymer, which process comprises:
    dissolving or emulsifying the ethylenically unsaturated monomer(s) in water to form an aqueous solution or emulsion containing from 30 to 90% by weight of monomer, based on the solution or emulsion;
    introducing the aqueous solution or emulsion into a polymerization zone by spraying; and
    polymerizing the monomer(s) in said polymerization zone at a temperature of from about 20° to 150° C. in a powder bed of a hydrophilic polymer and/or an inert inorganic material in powder form in the presence of an effective amount of a polymerization initiator and water as an auxilliary liquid, wherein the water is entirely or partially removed from the polymerization zone by evaporation during the polymerization.

2. A process as set forth in claim 1, in which an aqueous solution or emulsion of the ethylenically unsaturated compound(s), which has already been heated to the polymerization temperature, is introduced into the polymerization zone.

3. A process as set forth in claim 1, in which an aqueous solution or emulsion of the ethylenically unsaturated compound(s), which has already been heated to the polymerization temperature, is mixed with an aqueous solution of a polymerization initiator, which has also been heated to the polymerization temperature, and the mixture is introduced into the polymerization zone.

4. A process as set forth in claim 1, wherein from 5 to 40% by weight of the ethylenically unsaturated compounds is made up of material which is insoluble or sparingly soluble in water, the remainder being material soluble or swellable in water.

5. A process as set forth in claim 1, in which the ethylenically unsaturated compound(s) comprises one or more ethylenically unsaturated carboxylic acids of 3 to 5 carbon atoms or derivatives thereof.

6. A process as set forth in claim 1, in which the ethylenically unsaturated compounds comprise acrylic acid and acrylamide.

7. A process as set forth in claim 1, in which the or each ethylenically unsaturated compound used forms a hydrophilic homopolymer.

8. A process as set forth in claim 1, wherein the powder bed initially consists of the hydrophilic polymer to be manufactured, in powder form.

9. A process as set forth in claim 1, wherein the particle size of the powder in the initial powder bed is from 0.1 to 5 mm.

10. A process as set forth in claim 1, wherein sufficient water is evaporated during the polymerization to remove at least 50% of the heat of polymerization.